(12) United States Patent
Bohn et al.

(10) Patent No.: US 9,535,465 B2
(45) Date of Patent: Jan. 3, 2017

(54) HINGE ELECTRICAL INTERCONNECTION GUIDE

(75) Inventors: David D. Bohn, Fort Collins, CO (US); Paul M. O'Brien, Sammamish, WA (US); Christopher Bramley Fruhauf, San Anselmo, CA (US); Michael J. Basha, Brisbane, CA (US); Perry Q. Anderson, Kensington, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 13/024,506

(22) Filed: Feb. 10, 2011

(65) Prior Publication Data
US 2012/0206864 A1 Aug. 16, 2012

(51) Int. Cl.
*G06F 1/16* (2006.01)
*H04M 1/02* (2006.01)

(52) U.S. Cl.
CPC ........... *G06F 1/1683* (2013.01); *G06F 1/1616* (2013.01); *G06F 1/1681* (2013.01); *H04M 1/022* (2013.01); *Y10T 16/522* (2015.01); *Y10T 29/49117* (2015.01)

(58) Field of Classification Search
CPC ...... G06F 1/1683; G06F 1/1681; H04M 1/022
USPC ....................... 361/679.28; 16/366
See application file for complete search history.

(56) References Cited

U.S. PATENT DOCUMENTS

| | | | |
|---|---|---|---|
| 4,050,116 A | 9/1977 | Salice | |
| 4,949,426 A | 8/1990 | Komaki | |
| 5,052,078 A | 10/1991 | Hosoi | |
| 5,077,551 A | 12/1991 | Saitou | |
| 5,268,816 A * | 12/1993 | Abell et al. | 361/679.09 |
| 5,335,142 A * | 8/1994 | Anderson | 361/679.07 |
| 5,390,075 A * | 2/1995 | English et al. | 361/679.28 |
| 5,394,297 A * | 2/1995 | Toedter | 361/679.28 |
| 5,581,440 A * | 12/1996 | Toedter | 361/679.28 |
| 5,661,797 A | 8/1997 | Leman et al. | |

(Continued)

FOREIGN PATENT DOCUMENTS

| | | | |
|---|---|---|---|
| CN | 1536460 | 10/2004 | |
| JP | 06310874 A * | 11/1994 | H05K 5/02 |

OTHER PUBLICATIONS

"Non-Final Office Action", U.S. Appl. No. 13/084,284, (Dec. 12, 2012), 20 pages.

(Continued)

*Primary Examiner* — Adrian S Wilson
(74) *Attorney, Agent, or Firm* — Judy Yee; Micky Minhas

(57) ABSTRACT

In embodiments of a hinge electrical interconnection guide, a portable device includes a first housing integrated with a display device, and a second housing movably coupled to the first housing. A hinge assembly includes a hinge link to couple hinge mechanisms that are movably operable to open and close the first and second housings of the portable device relative to each other. An electrical interconnection guide is integrated with the hinge link and designed to route an electrical interconnection in a first configuration between the first and second housings of the device when closed relative to each other. The electrical interconnection guide is also designed to route the electrical interconnection in a second configuration between the first and second housings of the device when open relative to each other.

18 Claims, 5 Drawing Sheets

(56) References Cited

U.S. PATENT DOCUMENTS

| | | | |
|---|---|---|---|
| 5,827,082 A * | 10/1998 | Laine | 439/165 |
| 6,108,868 A | 8/2000 | Lin | |
| 6,223,393 B1 * | 5/2001 | Knopf | 16/366 |
| 6,230,365 B1 | 5/2001 | Lu | |
| 6,252,767 B1 | 6/2001 | Carlson | |
| 6,359,776 B2 * | 3/2002 | Carlson | 361/679.28 |
| 6,388,872 B1 | 5/2002 | Liao et al. | |
| 6,404,622 B1 * | 6/2002 | Chen | 361/679.28 |
| 6,553,625 B2 | 4/2003 | Lin et al. | |
| 6,692,275 B2 * | 2/2004 | Lee | 439/165 |
| 6,895,638 B2 * | 5/2005 | Lin | 16/368 |
| 7,054,147 B2 * | 5/2006 | Maatta et al. | 361/679.27 |
| 7,058,433 B2 | 6/2006 | Carpenter | |
| 7,106,579 B2 * | 9/2006 | Maskatia et al. | 361/679.28 |
| 7,155,266 B2 | 12/2006 | Stefansen | |
| 7,155,780 B2 | 1/2007 | Chen | |
| 7,266,864 B2 | 9/2007 | Kim | |
| 7,299,523 B2 * | 11/2007 | Zou | 16/287 |
| 7,374,424 B1 | 5/2008 | Nurmi et al. | |
| 7,414,834 B2 | 8/2008 | Ukonaho et al. | |
| 7,460,893 B2 * | 12/2008 | Aarras | G06F 1/1618 345/169 |
| 7,483,723 B2 | 1/2009 | Soderlund | |
| 7,484,271 B2 * | 2/2009 | Oshima et al. | 16/366 |
| 7,515,707 B2 | 4/2009 | Ka et al. | |
| 7,596,832 B2 | 10/2009 | Hsieh et al. | |
| 7,688,970 B2 * | 3/2010 | Garcia et al. | 379/433.05 |
| D616,405 S * | 5/2010 | Anand et al. | D14/138 AB |
| 7,719,827 B2 * | 5/2010 | Mihara et al. | 361/679.27 |
| 7,729,720 B2 * | 6/2010 | Suh et al. | 455/550.1 |
| 7,738,930 B2 | 6/2010 | Petrella | |
| 7,787,912 B2 | 8/2010 | Saila | |
| 7,787,914 B2 * | 8/2010 | Ahn et al. | 455/575.3 |
| 7,898,815 B2 * | 3/2011 | Tanaka et al. | 361/749 |
| 7,925,309 B2 * | 4/2011 | Soderlund | 455/575.1 |
| 7,930,803 B2 | 4/2011 | Ueyama et al. | |
| 7,933,118 B2 * | 4/2011 | Chiu et al. | 361/679.44 |
| 7,974,085 B2 * | 7/2011 | Ouyang | 361/679.27 |
| 8,004,833 B2 * | 8/2011 | Tseng et al. | 361/679.55 |
| 8,104,144 B2 | 1/2012 | Wang et al. | |
| 8,208,249 B2 * | 6/2012 | Chin et al. | 361/679.27 |
| 8,289,688 B2 * | 10/2012 | Behar et al. | 361/679.3 |
| 8,441,791 B2 | 5/2013 | Bohn et al. | |
| 8,451,601 B2 | 5/2013 | Bohn | |
| 8,773,849 B2 | 7/2014 | Bohn et al. | |
| 8,780,570 B2 | 7/2014 | Bohn et al. | |
| 8,804,324 B2 * | 8/2014 | Bohn et al. | 361/679.27 |
| 9,069,531 B2 | 6/2015 | Bohn et al. | |
| 2001/0003707 A1 | 6/2001 | Moriya | |
| 2001/0009499 A1 * | 7/2001 | Carlson | 361/683 |
| 2002/0069483 A1 | 6/2002 | Savolainen et al. | |
| 2004/0077199 A1 | 4/2004 | Winstead et al. | |
| 2004/0209641 A1 | 10/2004 | Hong | |
| 2004/0212968 A1 | 10/2004 | Lin | |
| 2004/0246667 A1 * | 12/2004 | Maskatia et al. | 361/683 |
| 2005/0055807 A1 * | 3/2005 | Maatta et al. | 16/366 |
| 2005/0079900 A1 | 4/2005 | Li | |
| 2005/0239520 A1 | 10/2005 | Stefansen | |
| 2006/0063572 A1 | 3/2006 | Garcia et al. | |
| 2006/0080805 A1 | 4/2006 | Takagi | |
| 2006/0171529 A1 | 8/2006 | Iikura | |
| 2006/0185122 A1 | 8/2006 | Saito et al. | |
| 2006/0198513 A1 | 9/2006 | Eldon | |
| 2006/0246964 A1 | 11/2006 | Castaneda et al. | |
| 2007/0000088 A1 | 1/2007 | Mao et al. | |
| 2007/0054710 A1 | 3/2007 | Pan | |
| 2007/0107163 A1 | 5/2007 | Barnett | |
| 2008/0158795 A1 * | 7/2008 | Aoki | G06F 1/1616 361/679.27 |
| 2008/0307608 A1 | 12/2008 | Goto | |
| 2009/0000062 A1 | 1/2009 | Yamanami | |
| 2009/0147458 A1 | 6/2009 | Wang et al. | |
| 2009/0151118 A1 | 6/2009 | Karkkola et al. | |
| 2009/0156260 A1 | 6/2009 | Derengowski et al. | |
| 2009/0227301 A1 | 9/2009 | Lindvall | |
| 2009/0265890 A1 | 10/2009 | Endo et al. | |
| 2009/0291719 A1 | 11/2009 | Christensen | |
| 2010/0071155 A1 | 3/2010 | Ueyama et al. | |
| 2010/0088853 A1 * | 4/2010 | Degner et al. | 16/342 |
| 2010/0232096 A1 | 9/2010 | Chen | |
| 2010/0304799 A1 | 12/2010 | Leung et al. | |
| 2011/0102986 A1 * | 5/2011 | Asakura et al. | 361/679.01 |
| 2011/0265288 A1 | 11/2011 | Chiang | |
| 2012/0162866 A1 | 6/2012 | Bohn | |
| 2012/0194972 A1 | 8/2012 | Bohn | |
| 2012/0206893 A1 | 8/2012 | Bohn | |
| 2012/0257368 A1 * | 10/2012 | Bohn et al. | 361/809 |
| 2012/0307472 A1 * | 12/2012 | Bohn et al. | 361/807 |
| 2014/0287804 A1 | 9/2014 | Bohn et al. | |

OTHER PUBLICATIONS

"Notice of Allowance", U.S. Appl. No. 12/978,162, (Nov. 30, 2012), 12 pages.

"Notice of Allowance", U.S. Appl. No. 13/017,460, (Nov. 30, 2012), 14 pages.

Kelander, et al., "Modeling for High-Speed Interconnects in Mobile Device Hinge Structures", Retrieved at <<http://ieeexplore.ieee.org/stamp/stamp.jsp?tp=&arnumber=4060770>>, Electronics Systemintegration Technology Conference, 2006, pp. 485-490.

"Fpc (Mobile Phone Flex Cable)", Retrieved from: <http://richli.en.made-in-china.com/product/FeBEzQgvHJic/China-Fpc-Mobile-Phone-Flex-Cable-.html>on Oct. 11, 2010, (2010),1 page.

Falcone, Joe "Microminiature Connector Solutions for Wireless Handheld Devices", Retrieved from: <http://www.ecnmag.com/Products/2009/08/Microminiature-Connector-Solutions-for-Wireless-Handheld-Devices/> on Oct. 11, 2010, (Aug. 21, 2009),4 pages.

Ruhfass, Michelle "Review: Samsung's Double Jointed SCH-u740", Retrieved from: <http://www.mobileburn.com/review.jsp?Id=3188> on Oct. 27, 2010, (Mar. 1, 2007),2 pages.

Wattanajantra, Asavin "Fujitsu dual-touchscreen concept phone will have you feeling double", Retrieved from: <http://crave.cnet.co.uk/mobiles/fujitsu-dual-touchscreen-concept-phone-will-have-you-feeling-double-50001064/> on Oct. 8, 2010 (Oct. 7, 2010),11 pages.

Bohn, et al., "Double Hinge Axial Claims", U.S. Appl. No. 13/017,460, (Jan. 31, 2011), pp. 1-17.

Bohn, et al. "Double Hinge Torsion Bar", U.S. Appl. No. 13/027,021, (Feb. 14, 2011), pp. 1-18.

Bohn, et al., "Double Hinge Radial Claims", U.S. Appl. No. 12/978,162, (Dec. 23, 2010), pp. 1-16.

Bohn, et al., "Hinge Electrical Interconnection Guide", U.S. Appl. No. 13/024,506, (Feb. 10, 2010), pp. 1-19.

"Final Office Action", U.S. Appl. No. 13/084,284, (Apr. 12, 2013), 22 pages.

"Non-Final Office Action", U.S. Appl. No. 13/027,021, (Jul. 2, 2013),11 pages.

"Restriction Requirement", U.S. Appl. No. 13/027,021, (Apr. 4, 2013), 7 pages.

"Final Office Action", U.S. Appl. No. 13/027,021, Dec. 17, 2013, 8 pages.

"Non-Final Office Action", U.S. Appl. No. 13/084,284, Oct. 3, 2013, 28 pages.

"Foreign Office Action", CN Application No. 201210029063.0, Jan. 26, 2014, 11 Pages.

"Foreign Office Action", CN Application No. 201210029063.0, Jun. 4, 2014, 13 Pages.

"Notice of Allowance", U.S. Appl. No. 13/027,021, Mar. 12, 2014, 6 pages.

"Notice of Allowance", U.S. Appl. No. 13/084,284, Feb. 28, 2014, 9 pages.

"Supplemental Notice of Allowance", U.S. Appl. No. 13/027,021, Jun. 10, 2014, 4 pages.

"Non-Final Office Action", U.S. Appl. No. 14/298,107, Oct. 1, 2014, 7 pages.

"Foreign Office Action", CN Application No. 201210029063.0, Oct. 14, 2014, 9 Pages.

(56) References Cited

OTHER PUBLICATIONS

"Foreign Office Action", CN Application No. 201210031884.8, Jul. 1, 2015, 11 Pages.
"Supplemental Notice of Allowance", U.S. Appl. No. 14/298,107, 06/01/215, 4 pages.
"Notice of Allowance", U.S. Appl. No. 14/298,107, Feb. 20, 2015, 6 pages.
"Foreign Office Action", CN Application No. 201210031884.8, Mar. 25, 2016, 11 Pages.

* cited by examiner

HINGE ELECTRICAL INTERCONNECTION GUIDE

BACKGROUND

Mobile phones and portable devices are increasingly common, and many include dual displays and/or a display device that opens and closes relative to a handheld base of a device. For example, a mobile computer device can be hinged to open two display devices, each integrated into a side or half of the device housing. However, hinge mechanisms can include relatively complex rotating hinges and hardware components to position the display screens for use, and are further complicated when used as a conduit to route electrical interconnections from components in one side of a device to components in the other side of the device. Additionally, the voids in the housing sections of a device in which the hinges are installed may also be used as a path to route the electrical interconnections in the device. In conventional designs, a flexible printed circuit (FPC) may be routed through a single barrel hinge, which is a common design for flip phones; the FPC may be externally exposed, which is a common design for laptop computers and similar devices; or bundled coaxial cables are routed axially through a hinge, which is also a common design for laptop computers.

SUMMARY

This summary is provided to introduce simplified concepts of a hinge electrical interconnection guide that are further described below in the Detailed Description. This summary is not intended to identify essential features of the claimed subject matter, nor is it intended for use in determining the scope of the claimed subject matter.

A hinge electrical interconnection guide is described. In embodiments, a portable device includes a first housing integrated with a display device, and a second housing movably coupled to the first housing. A hinge assembly includes a hinge link to couple hinge mechanisms that are movably operable to open and close the first and second housings of the portable device relative to each other. An electrical interconnection guide is integrated with the hinge link and designed to route an electrical interconnection in a first configuration between the first and second housings of the device when closed relative to each other. The electrical interconnection guide is also designed to route the electrical interconnection in a second configuration between the first and second housings of the device when open relative to each other.

In other embodiments, the electrical interconnection guide is integrated with the hinge link of a double hinge. The hinge mechanisms of the double hinge can be implemented as axial cams, radial cams, or friction hinges. The hinge assembly includes a hinge chassis that attaches the first and second housings of the device, and the hinge chassis couples the hinge mechanisms and the hinge link with the integrated electrical interconnection guide in the portable device. The electrical interconnection that is routed in the electrical interconnection guide may be a flexible printed circuit, a coaxial cable, or the flexible printed circuit bundled with the coaxial cable. Alternatively or in addition, the electrical interconnection may include a micro-coaxial cable, an antenna coaxial cable, an optical fiber, or a wired connection.

In other embodiments, the electrical interconnection guide routes the electrical interconnection external of the hinge link and hinge mechanisms, but internal to the portable device. The electrical interconnection guide can also include a cover to shield the electrical interconnection from potential external damage. The electrical interconnection guide routes the electrical interconnection in the first configuration when the hinge mechanisms operate to close the first and second housings of the portable device. The electrical interconnection guide also routes the electrical interconnection in the second configuration when the hinge mechanisms operate to open the first and second housings of the portable device.

BRIEF DESCRIPTION OF THE DRAWINGS

Embodiments of a hinge electrical interconnection guide are described with reference to the following drawings. The same numbers are used throughout the drawings to reference like features and components.

DETAILED DESCRIPTION

A hinge electrical interconnection guide is described. In embodiments, a portable device, such as mobile phone or computer device, with two housing sections includes hinge assemblies that each include a hinge chassis designed to attach to the housing sections of the portable device. Each hinge assembly includes a hinge link with an integrated electrical interconnection guide designed to route one or more electrical interconnections between the two housing sections of the portable device. Often, components in one side, or in the first housing, of a device are electrically connected to components in the other side, or the second housing, of the device. An electrical interconnection may include any one or combination of a flexible printed circuit (FPC), a coaxial cable, the flexible printed circuit bundled with a coaxial cable, a micro-coaxial cable, an antenna coaxial cable, an optical fiber, or any other type of wired connection.

The electrical interconnection guide can be integrated with the hinge link of a hinge assembly and contoured to follow the shape of the hinge link. When routed via the electrical interconnection guide, an electrical interconnection can be mostly hidden from view and protected from potential external damage. Additionally, the electrical interconnection can be routed external of the hinge link and hinge assembly via the electrical interconnection guide, rather than internally through an internal void of the hinge assembly and/or hinge link.

While features and concepts of the described systems and methods for a hinge electrical interconnection guide can be implemented in any number of different environments, systems, devices, and/or various configurations, embodiments of a hinge electrical interconnection guide are described in the context of the following example devices, systems, and configurations.

Figure 1:
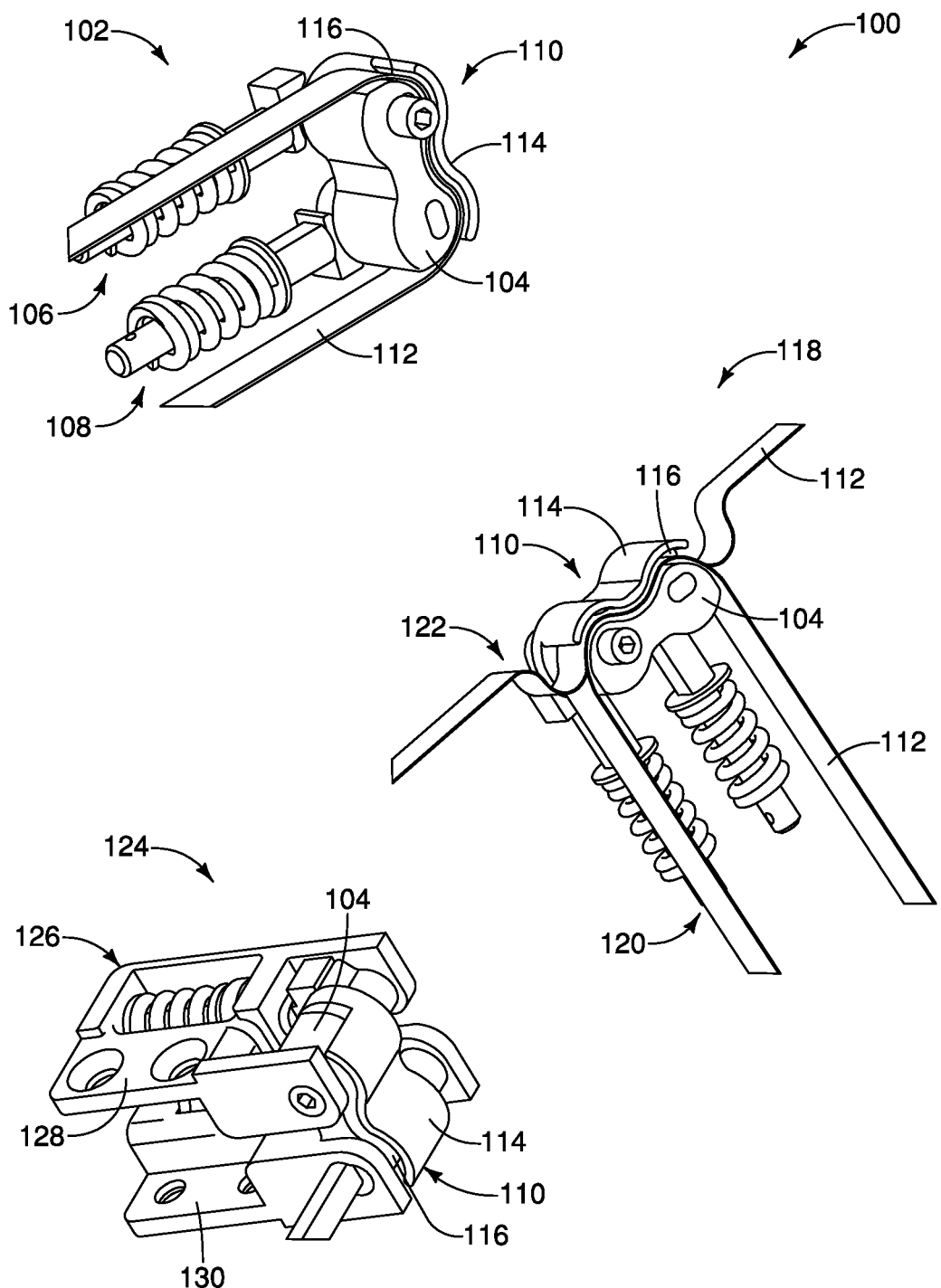
FIG. 1 illustrates an example of a hinge assembly that includes a hinge electrical interconnection guide in accordance with one or more embodiments.
Figure 2:
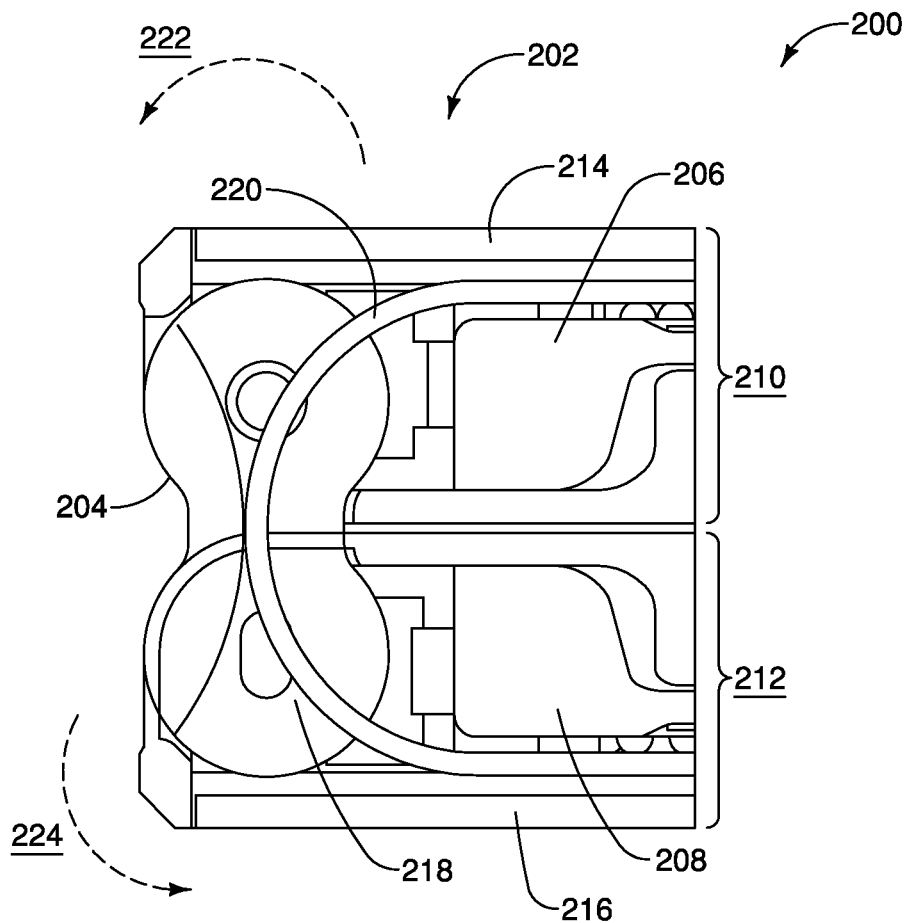
FIG. 2 illustrates another example of a hinge assembly that includes a hinge electrical interconnection guide in accordance with one or more embodiments.
Figure 2:
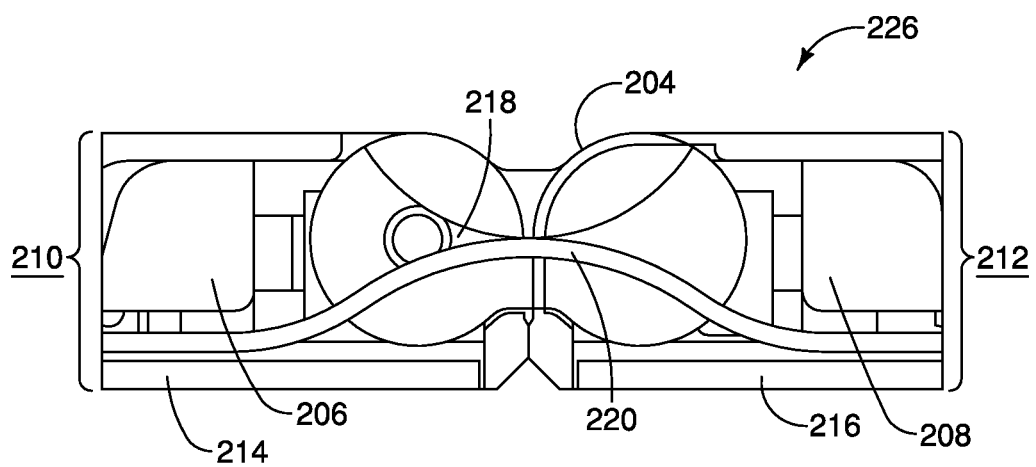
Figure 3:
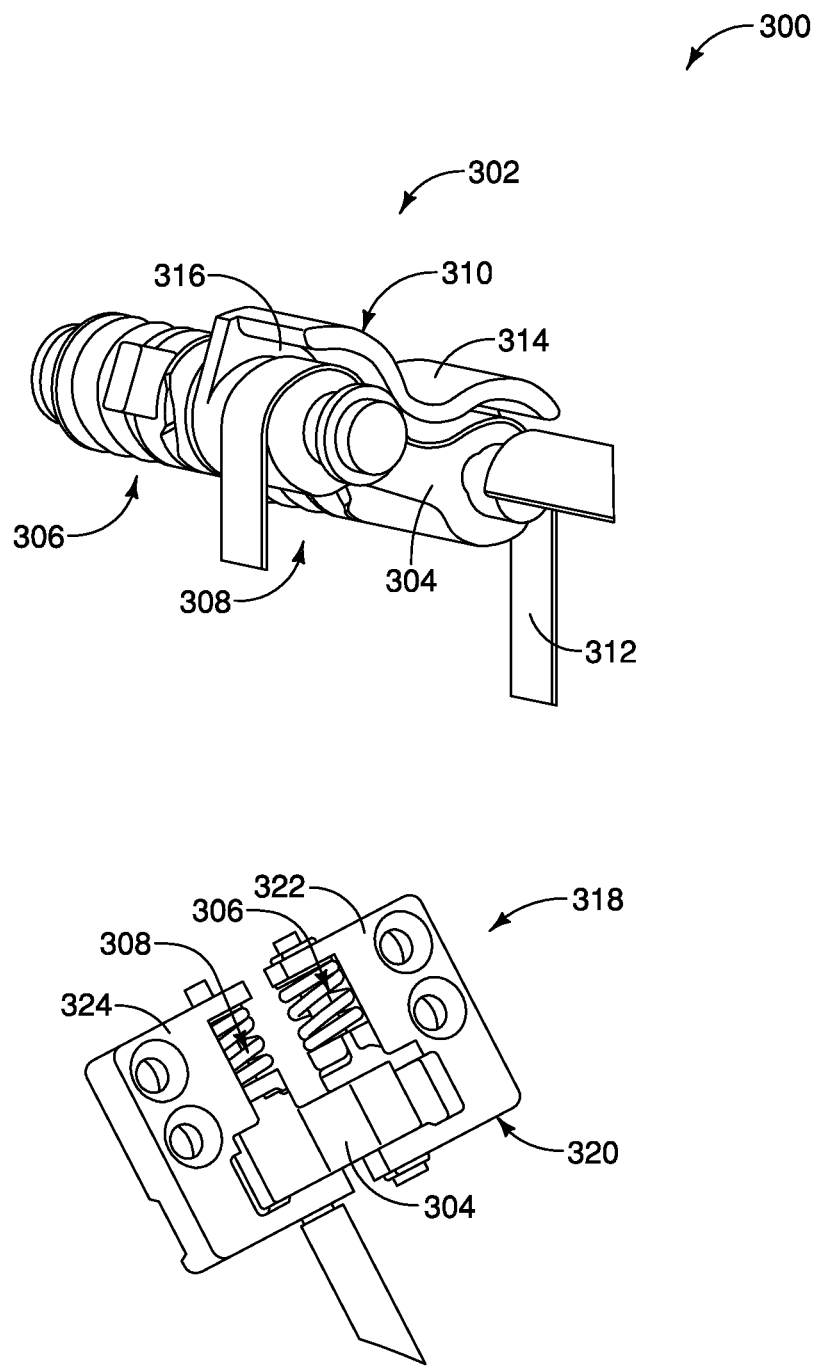
FIG. 3 illustrates another example of a hinge assembly that includes a hinge electrical interconnection guide in accordance with one or more embodiments.

FIG. 1 illustrates an example of a hinge assembly 100 in accordance with embodiments described herein. In this example, the hinge assembly is a double hinge with radial cams. As shown in a first view 102, the hinge assembly includes a hinge link 104 that couples hinge mechanisms 106, 108 that are movably operable to open and close housing sections of a portable device relative to each other. In embodiments, any of the hinge assemblies described herein may be implemented as a double hinge with radial cams as shown in FIGS. 1 and 2, as a double hinge with axial cams as shown in FIG. 3, or as friction hinges that include mechanisms operable to actuate based on friction (e.g., friction disk, Reell clip, "question-mark" hinge, etc.).

In embodiments, the hinge assembly includes an electrical interconnection guide 110 that is integrated with the hinge link 104. The electrical interconnection guide routes an electrical interconnection 112 via the hinge assembly. The electrical interconnection may be any one or combination of a flexible printed circuit (FPC), a coaxial cable, the flexible printed circuit bundled with a coaxial cable, a micro-coaxial cable, an antenna coaxial cable, an optical fiber, or any other type of wired connection.

The electrical interconnection guide 110 includes a cover 114 to shield the electrical interconnection from potential external damage. In this example, the cover is contoured to follow the shape of the hinge link 104. The electrical interconnection guide also includes a channel or void 116 (e.g., may also be referred to as a groove, notch, slot, and the like) via which the electrical interconnection 112 is routed, such as from one side or first housing of a portable device to the other side or second housing of the portable device. Often, components in one side, or in the first housing, of a device are electrically connected to components in the other side, or the second housing, of the device. In embodiments, the electrical interconnection guide routes the electrical interconnection external of the hinge link and hinge mechanisms, rather than internally through the hinge mechanisms and/or through an internal void of the hinge link. The electrical interconnection guide also routes the electrical interconnection internal to the portable device, rather than externally where the electrical interconnection may be visible and susceptible to damage.

As shown in a second view 118 of the hinge assembly, the electrical interconnection guide 110 can route the electrical interconnection 112 in a first configuration 120, such as between the first and second housings of a portable device when the housing sections are closed relative to each other. The electrical interconnection is routed in the first configuration when the hinge mechanisms 106, 108 operate to close the first and second housings of the portable device. In embodiments, the electrical interconnection guide can also route the electrical interconnection in a second configuration 122, such as between the first and second housings of the portable device when the housing sections are open relative to each other. The electrical interconnection is routed in the second configuration when the hinge mechanisms operate to open the first and second housings of the portable device.

As shown in a third view 124, the hinge assembly includes a hinge chassis 126 designed to attach to the housing sections of a portable device. The hinge chassis of the double hinge is shown in a closed position and has a first half 128 and a second half 130, both designed to couple the hinge mechanisms 106, 108 and the hinge link 104 with the integrated electrical interconnection guide 110 in the portable device. The hinge assembly (e.g., double hinge assembly with radial cams in this example) can be implemented in any type of portable device, such as a mobile phone or laptop computer, that is designed to open and close. For example, a portable device may include two hinges and two housing sections that are attached to the hinge chassis of the hinges. The housing sections of the portable device can be rotated from a closed position at approximately zero degrees (0°) to an open position at approximately one-hundred and eighty degrees (180°) with the double hinges. The double hinges may also be implemented to rotate the housing sections of the portable device approximately three-hundred and sixty degrees (360°) relative to each other.

FIG. 2 illustrates another example of a hinge assembly 200 in accordance with embodiments described herein. Similar to the hinge assembly shown in FIG. 1, the hinge assembly 200 in this example is a double hinge with radial cams, and is shown in a closed position in a first view 202. The hinge assembly includes a hinge link 204 that couples hinge mechanisms 206, 208 that are movably operable to open and close respective housing sections 210, 212 of a portable device relative to each other. In this example, the first housing section 210 includes an integrated display device 214, and similarly, the second housing section 212 includes an integrated display device 216. In embodiments, the hinge assembly includes an electrical interconnection guide 218 that is integrated with the hinge link 204. The electrical interconnection guide routes an electrical interconnection 220 via the hinge assembly. The electrical interconnection may be any one or combination of a flexible printed circuit (FPC), a coaxial cable, the flexible printed circuit bundled with a coaxial cable, a micro-coaxial cable, an antenna coaxial cable, an optical fiber, or any other type of wired connection.

The double hinge assembly is operable with a first actuation at 222 to open the first housing 210 approximately ninety degrees (90°) relative to the second housing 212, and then operable with a second actuation at 224 to open the first and second housings approximately one-hundred and eighty degrees (180°) relative to each other. As shown in a second view 226, the hinge assembly 200 is shown in the open position. The electrical interconnection guide 218 can route the electrical interconnection 220 in a first configuration, such as between the first and second housings of a portable device when the housing sections are closed relative to each other as shown in the first view 202. The electrical interconnection guide can also route the electrical interconnection in a second configuration, such as between the first and second housings of the portable device when the housing sections are open relative to each other as shown in the second view 226.

FIG. 3 illustrates another example of a hinge assembly 300 in accordance with embodiments described herein. In this example, the hinge assembly is a double hinge with axial cams. As shown in a first view 302, the hinge assembly includes a hinge link 304 that couples hinge mechanisms 306, 308 that are movably operable to open and close housing sections of a portable device relative to each other. In embodiments, the hinge assembly includes an electrical interconnection guide 310 that is integrated with the hinge link 304. The electrical interconnection guide routes an electrical interconnection 312 via the hinge assembly. The electrical interconnection may be any one or combination of a flexible printed circuit (FPC), a coaxial cable, the flexible printed circuit bundled with a coaxial cable, a micro-coaxial cable, an antenna coaxial cable, an optical fiber, or any other type of wired connection.

The electrical interconnection guide 310 includes a cover 314 to shield the electrical interconnection from potential external damage. In this example, the cover is contoured to follow the shape of the hinge link 304. The electrical interconnection guide also includes a channel or void 316 via which the electrical interconnection 312 is routed, such as from one side or first housing of a portable device to the other side or second housing of the portable device. In embodiments, the electrical interconnection guide routes the electrical interconnection external of the hinge link and hinge mechanisms, rather than internally through the hinge mechanisms and/or through an internal void of the hinge link. The electrical interconnection guide also routes the electrical interconnection internal to the portable device, rather than externally where the electrical interconnection would be visible and susceptible to damage.

As shown in a second view 318, the hinge assembly includes a hinge chassis 320 designed to attach to the housing sections of a portable device. The hinge chassis of the double hinge is shown in an open position and has a first half 322 and a second half 324, both designed to couple the hinge mechanisms 306, 308 and the hinge link 304 with the integrated electrical interconnection guide in the portable device. The hinge assembly (e.g., double hinge assembly with axial cams in this example) can be implemented in any type of portable device, such as a mobile phone or laptop computer, that is designed to open and close. For example, a portable device may include two hinges and two housing sections that are attached to the hinge chassis of the hinges. The housing sections of the portable device can be rotated from a closed position at approximately zero degrees (0°) to an open position at approximately one-hundred and eighty degrees (180°) with the double hinges. The double hinges may also be implemented to rotate the housing sections of the portable device approximately three-hundred and sixty degrees (360°) relative to each other.

Figure 4:
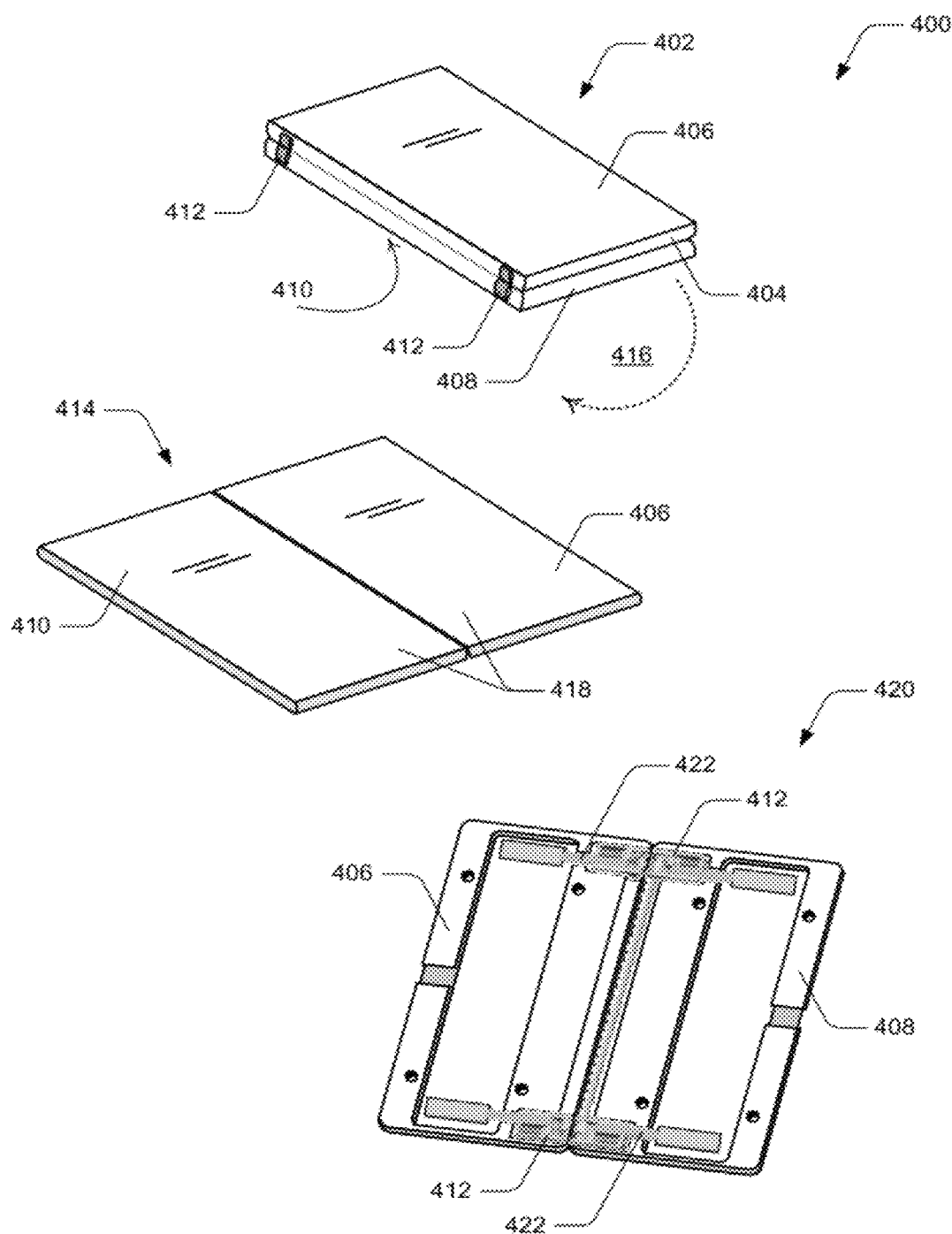
FIG. 4 illustrates examples of a portable device that includes hinge assemblies with a hinge electrical interconnection guide in accordance with one or more embodiments.

FIG. 4 illustrates examples of a portable device 400 that can be implemented to include hinge assemblies with electrical interconnection guides in accordance with embodiments described herein. In embodiments, the portable device may be any form of a consumer, computer, user, communication, phone, navigation, television, appliance, gaming, media playback, and/or electronic device. In a first view 402, the portable device is shown in a closed position. The portable device has a first housing 404 with an integrated display device 406, and also has a second housing 408 that may include a physical keyboard or an additional display device 410 (e.g., on the underside of the portable device as shown in this example). Correspondingly, the display devices are viewable from opposite sides of the portable device in the closed position of the first and second housings (also referred to herein as an anti-book mode). This closed position of the portable device corresponds to the first view 202 of the hinge assembly 200 shown in FIG. 2 when viewed from an end-perspective.

The first housing 404 is movably coupled to the second housing 408 by the hinge assemblies 412 (e.g., double hinges in this example), which are installed in the device between the display devices and operable to open from the closed position at approximately zero degrees (0°) to an open position at approximately one-hundred and eighty degrees (180°), as well as rotated through approximately three-hundred and sixty degrees (360°). In a second view 414, the portable device 400 is shown in an open position, such as when the second housing 408 is rotated around and up at 416 to position the display device 406 and the additional display device 410 adjacent each other to form a surface display 418 (e.g., the two display devices appear as one larger display surface). In the open position, the hinges are not visible, and are designed to allow the display devices coming together in the open position. This open position of the portable device corresponds to the second view 226 of the hinge assembly 200 shown in FIG. 2 when viewed from an end-perspective. In a third view 420, an internal view of the first and second housings of the portable device includes the hinge assemblies 412. The electrical interconnections 422 are routed between the first housing 404 and the second housing 408 via an electrical interconnection guide that is integrated with a hinge link of a hinge assembly 412.

Figure 5:
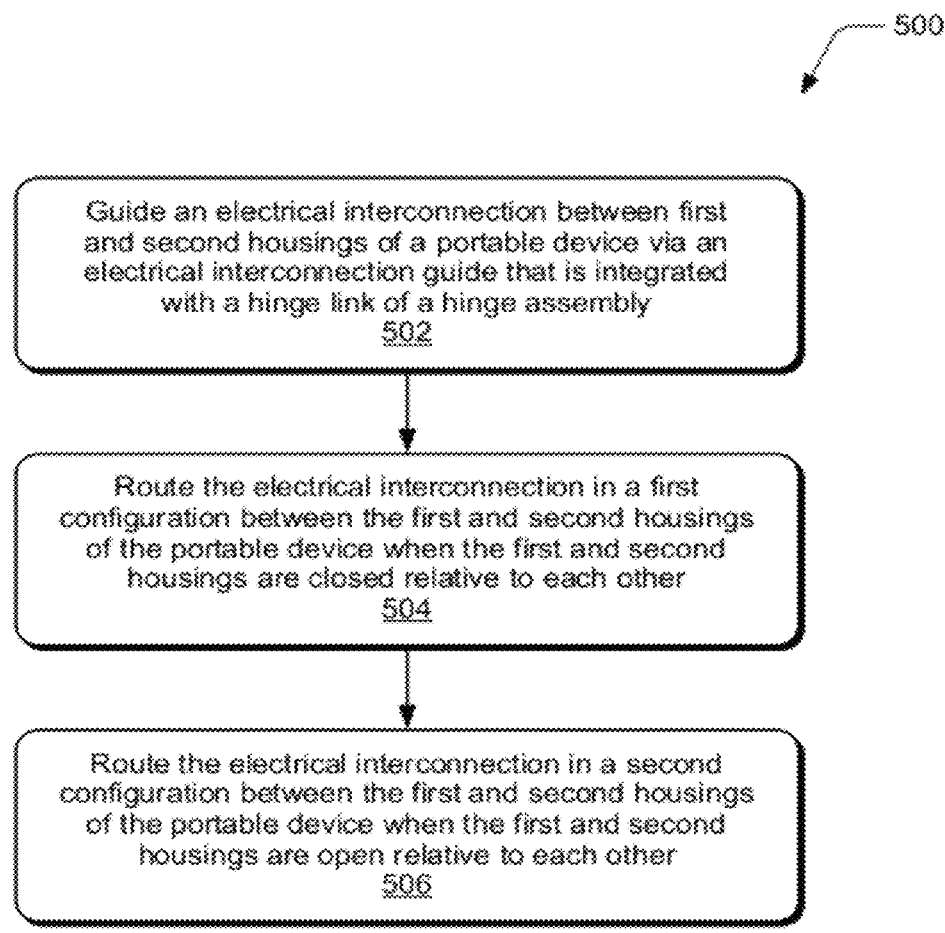
FIG. 5 illustrates example method(s) of a hinge electrical interconnection guide in accordance with one or more embodiments.

FIG. 5 illustrates example method(s) 500 of a hinge electrical interconnection guide. The order in which the method blocks are described are not intended to be construed as a limitation, and any number of the described method blocks can be combined in any order to implement a method, or an alternate method.

At block 502, an electrical interconnection guides between first and second housings of a portable device via an electrical interconnection guide that is integrated with a hinge link of a hinge assembly. For example, the electrical interconnection guide 110 (FIG. 1) is integrated with the hinge link 104 of the hinge assembly 100, and the electrical interconnection 112 is guided between the first and second housings of the portable device 400 (FIG. 4). The electrical interconnection that is routed in the electrical interconnection guide may be a flexible printed circuit, a coaxial cable, or the flexible printed circuit bundled with a coaxial cable. Alternatively or in addition, the electrical interconnection may include a micro-coaxial cable, an antenna coaxial cable, an optical fiber, or a wired connection.

In another example, the electrical interconnection guide 218 (FIG. 2) is integrated with the hinge link 204 of the hinge assembly 200, and the electrical interconnection 220 is guided between the first housing 210 and the second housing 212 of the portable device 400. In another example, the electrical interconnection guide 316 (FIG. 3) is integrated with the hinge link 304 of the hinge assembly 300, and the electrical interconnection 312 is guided between the first and second housings of the portable device 400.

At block 504, the electrical interconnection is routed in a first configuration between the first and second housings of a portable device when the first and second housings are closed relative to each other. For example, the electrical interconnection guide 110 routes the electrical interconnection 112 in a first configuration 120, such as between the first and second housings of a portable device when the housing sections are closed relative to each other. The electrical interconnection is routed in the first configuration when the hinge mechanisms 106, 108 operate to close the first and second housings of the portable device.

At block 506, the electrical interconnection is routed in a second configuration between the first and second housings of the portable device when the first and second housings are open relative to each other. For example, electrical interconnection guide 110 routes the electrical interconnection 112 in a second configuration 122, such as between the first and second housings of the portable device when the housing sections are open relative to each other. The electrical interconnection is routed in the second configuration when the hinge mechanisms 106, 108 operate to open the first and second housings of the portable device.

Although embodiments of a hinge electrical interconnection guide have been described in language specific to features and/or methods, the subject of the appended claims is not necessarily limited to the specific features or methods described. Rather, the specific features and methods are disclosed as example implementations of a hinge electrical interconnection guide.

The invention claimed is:

1. A portable device, comprising:
a first housing integrated with a display device;
a second housing movably coupled to the first housing;
a hinge assembly comprising a hinge link configured to couple hinge mechanisms that are movably operable to open and close the first and second housings relative to each other by rotation about an axis of the hinge assembly into at least a first position in which display surfaces of the first and second housings face one another and a second position in which the display surfaces of the first and second housings are adjacent to one another to form a combined surface which conceals the hinge mechanisms;
an electrical interconnection guide integrated with the hinge link, the electrical interconnection guide configured to:
route an electrical interconnection such that the electrical interconnection is in a first configuration between the first and second housings when the first and second housings are closed relative to each other; and
route the electrical interconnection such that the electrical interconnection is in a second configuration between the first and second housings when the first and second housings are open relative to each other;
the electrical interconnection guide further configured to route the electrical interconnection through a channel external of the hinge link and hinge mechanisms, and internal to the portable device, the channel routing the electrical interconnection perpendicular to the axis of rotation of the hinge link from the first housing to the second housing and between the hinge link and a cover that shields the electronic interconnection from an exterior of the portable device.

2. A portable device as recited in claim 1, wherein the electrical interconnection guide is configured to route the electrical interconnection comprising at least one of a flexible printed circuit, a coaxial cable, or the flexible printed circuit bundled with the coaxial cable.

3. A portable device as recited in claim 1, wherein the electrical interconnection guide is configured to route the electrical interconnection comprising at least one of a micro-coaxial cable, an antenna coaxial cable, an optical fiber, or a wired connection.

4. A portable device as recited in claim 1, wherein the electrical interconnection guide is further configured to:
route the electrical interconnection in the first configuration when the hinge mechanisms operate to close the first and second housings of the portable device; and
route the electrical interconnection in the second configuration when the hinge mechanisms operate to open the first and second housings of the portable device.

5. A portable device as recited in claim 1, wherein the electrical interconnection guide is integrated with the hinge link of a double hinge, and the hinge mechanisms of the double hinge comprise at least one of axial cams, radial cams, or friction hinges.

6. A portable device as recited in claim 1, further comprising a hinge chassis configured for attachment to the first and second housings, the hinge chassis further configured to couple the hinge mechanisms and the hinge link with the integrated electrical interconnection guide in the portable device.

7. A hinge assembly, comprising:
hinge mechanisms movably operable to open and close first and second housings of a portable device relative to each other to achieve a plurality of positions between a closed position in which a display of the first housing faces a display of the second housing and an open position in which the first and second housings are rotated approximately three hundred sixty degrees about an axis of rotation of the hinge mechanisms from the closed position relative to one another;
a hinge link configured to couple the hinge mechanisms;
an electrical interconnection guide integrated with the hinge link, the electrical interconnection guide configured to:
route an electrical interconnection such that the electrical interconnection is in a first configuration between the first and second housings when the first and second housings are closed relative to each other; and
route the electrical interconnection such that the electrical interconnection is in a second configuration between the first and second housings when the first and second housings are open relative to each other;
the electrical interconnection guide further configured to route the electrical interconnection through a channel external of the hinge link and hinge mechanisms, and internal to the portable device, the channel routing the electrical interconnection perpendicular to the axis of rotation of the hinge mechanisms from the first housing to the second housing and between the hinge link and a cover that shields the electronic interconnection from an exterior of the portable device.

8. A hinge assembly as recited in claim 7, wherein the electrical interconnection guide is configured to route the electrical interconnection comprising at least one of a flexible printed circuit, a coaxial cable, or the flexible printed circuit bundled with the coaxial cable.

9. A hinge assembly as recited in claim 7, wherein the electrical interconnection guide is configured to route the electrical interconnection comprising at least one of a micro-coaxial cable, an antenna coaxial cable, an optical fiber, or a wired connection.

10. A hinge assembly as recited in claim 7, wherein the electrical interconnection guide is further configured to route the electrical interconnection in the first configuration when the hinge mechanisms operate to close the first and second housings of the portable device.

11. A hinge assembly as recited in claim 7, wherein the electrical interconnection guide is further configured to route the electrical interconnection in the second configuration when the hinge mechanisms operate to open the first and second housings of the portable device.

12. A hinge assembly as recited in claim 7, wherein the electrical interconnection guide is integrated with the hinge link of a double hinge, and the hinge mechanisms of the double hinge comprise at least one of axial cams, radial cams, or friction hinges.

13. A hinge assembly as recited in claim 7, further comprising a hinge chassis configured for attachment to the first and second housings of the portable device, the hinge chassis further configured to couple the hinge mechanisms and the hinge link with the integrated electrical interconnection guide in the portable device.

14. A method, comprising:
guiding an electrical interconnection between first and second housings of a portable device via an electrical interconnection guide integrated with a hinge link that couples hinge mechanisms which are movably operable to achieve a closed position in which a display of the first housing faces a display of the second housing, an open position in which the first and second housings are rotated about an axis of rotation of the hinge link approximately three hundred sixty degrees from the closed position relative to one another, and multiple positions between the closed position and the open position, wherein the electrical interconnection guide is configured to route the electrical interconnection through a channel external of the hinge link and hinge mechanisms, and internal to the portable device, the channel routing the electrical interconnection perpendicular to the axis of rotation of the hinge link from the first housing to the second housing and between the hinge link and a cover that shields the electronic interconnection from an exterior of the portable device;

routing the electrical interconnection such that the electrical interconnection is in a first configuration between the first and second housings of a portable device when the first and second housings are closed relative to each other; and routing the electrical interconnection such that the electrical interconnection is in a second configuration between the first and second housings of the portable device when the first and second housings are open relative to each other.

15. A method as recited in claim 14, wherein the electrical interconnection comprises at least one of a flexible printed circuit, a coaxial cable, or the flexible printed circuit bundled with the coaxial cable.

16. A method as recited in claim 14, wherein the electrical interconnection comprises at least one of a micro-coaxial cable, an antenna coaxial cable, an optical fiber, or a wired connection.

17. A method as recited in claim 14, wherein:
the electrical interconnection is routed in the first configuration when the hinge mechanisms operate to close the first and second housings of the portable device; and
the electrical interconnection is routed in the second configuration when the hinge mechanisms operate to open the first and second housings of the portable device.

18. A method as recited in claim 14, wherein the electrical interconnection guide is integrated with the hinge link of a double hinge, and the hinge mechanisms of the double hinge comprise at least one of axial cams, radial cams, or friction hinges.

* * * * *